United States Patent
Arbeiter et al.

(10) Patent No.: US 6,195,394 B1
(45) Date of Patent: Feb. 27, 2001

(54) PROCESSING APPARATUS FOR USE IN REDUCING VISIBLE ARTIFACTS IN THE DISPLAY OF STATISTICALLY COMPRESSED AND THEN DECOMPRESSED DIGITAL MOTION PICTURES

(75) Inventors: James Henry Arbeiter, Hopewell; Roger Frank Bessler, Lawrenceville, both of NJ (US)

(73) Assignee: North Shore Laboratories, Inc., Pennigton, NJ (US)

( * ) Notice: Subject to any disclaimer, the term of this patent is extended or adjusted under 35 U.S.C. 154(b) by 0 days.

(21) Appl. No.: 09/201,402

(22) Filed: Nov. 30, 1998

(51) Int. Cl.[7] ........................................... H04B 1/06
(52) U.S. Cl. ........................ 375/240.29; 348/424
(58) Field of Search ............................. 348/400.1, 402.1, 348/404.1, 405.1, 409.1, 410.1, 411.1, 412.1, 413.1, 415.1, 606.1, 607.1, 387.1, 389.1; 382/232, 253, 299, 56, 30, 36; 375/240, 240.01, 240.13, 240.29, 240.16

(56) References Cited

U.S. PATENT DOCUMENTS

| | | | |
|---|---|---|---|
| 5,596,659 | * 1/1997 | Normile et al. | 382/253 |
| 5,642,165 | * 6/1997 | Suzuki | 348/404 |
| 5,734,419 | * 3/1998 | Botsfor, III et al. | 348/97 |
| 5,748,243 | * 5/1998 | Suzuki | 348/405 |
| 5,793,425 | * 8/1998 | Balkrishnan | 348/387 |
| 5,822,465 | * 10/1998 | Normile et al. | 382/253 |
| 5,974,179 | * 10/1999 | Caklovic | 382/232 |
| 6,054,943 | * 4/2000 | Lawrence | 341/87 |

* cited by examiner

Primary Examiner—Chris S. Kelley
Assistant Examiner—Tung Vo
(74) Attorney, Agent, or Firm—George J. Seligsohn

(57) ABSTRACT

A compressed data system, which communicates content of each of successive original frames of a digital motion picture over a limited-bandwidth transmission channel, comprises a digitally-controlled pre-processor and a digitally-controlled post-processor. The digitally-controlled pre-processor is effective in reducing the spatial-frequency bandwidth of the content of an original frame, applied to the input of a compression encoder, in response to the digital control value of a first digital control signal, applied as a control input to the pre-processor, being indicative of the fact that the bandwidth of the compressed data to be communicated over the limited-bandwidth transmission channel would exceed the limited bandwidth of the transmission channel. Further, the pre-processor derives one or more digital control values of a second digital control signal communicated over the limited-bandwidth transmission channel without ever being compressed directly to the digitally-controlled post-processor. The digitally-controlled post-processor is capable of employing the one or more digital control values of the second digital control signal communicated thereto to control the synthetic extension of the spatial-frequency bandwidth of the content of any communicated digital motion picture frame having a reduced spatial-frequency bandwidth by an amount which results in the substantially restoration to the spatial-frequency bandwidth of the corresponding original frame. Permits either an increase the number of frames per second of a motion picture that can be communicated over narrow-band transmission channel or, in a wide-band channel, no decrease in the level of quantization of the image samples in response to the occurrence of excessive image-frame spatial information.

17 Claims, 13 Drawing Sheets

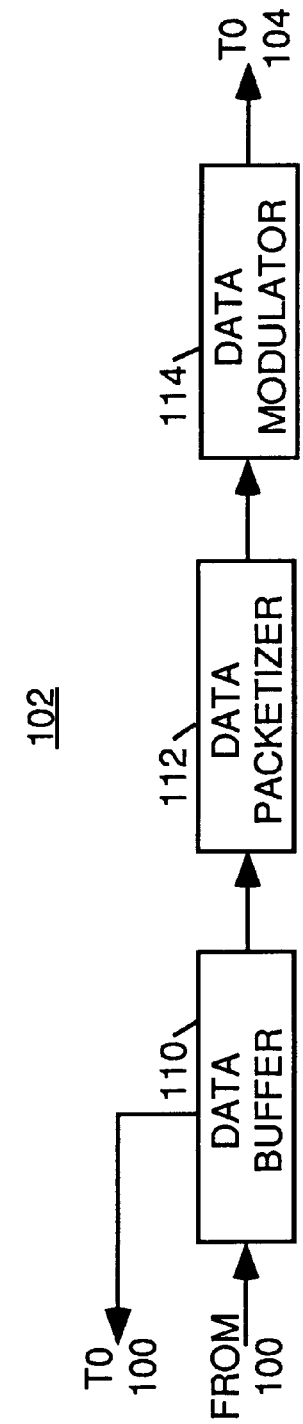
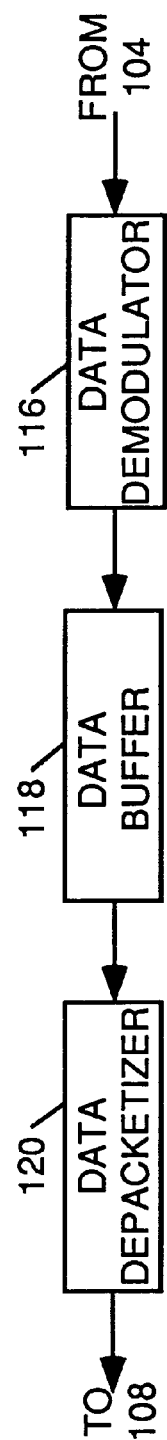

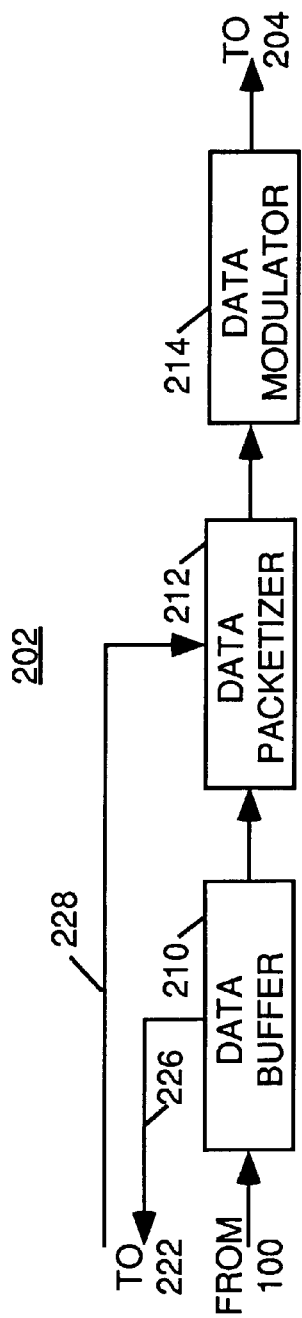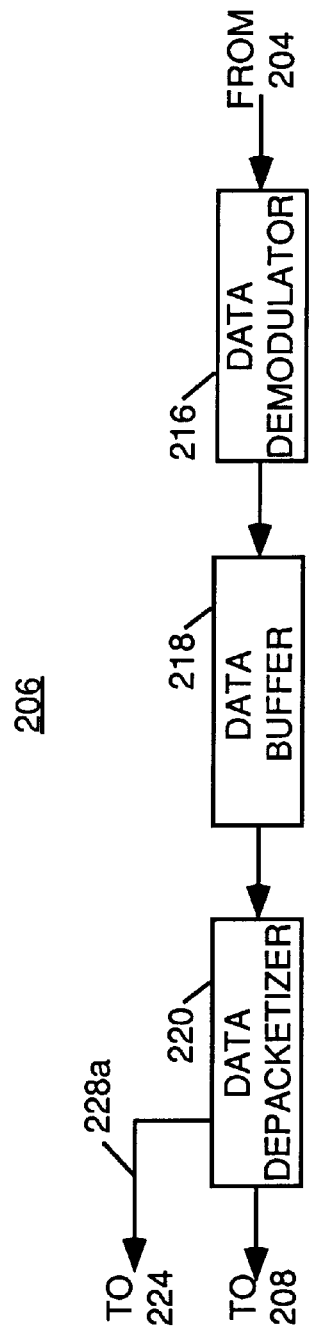

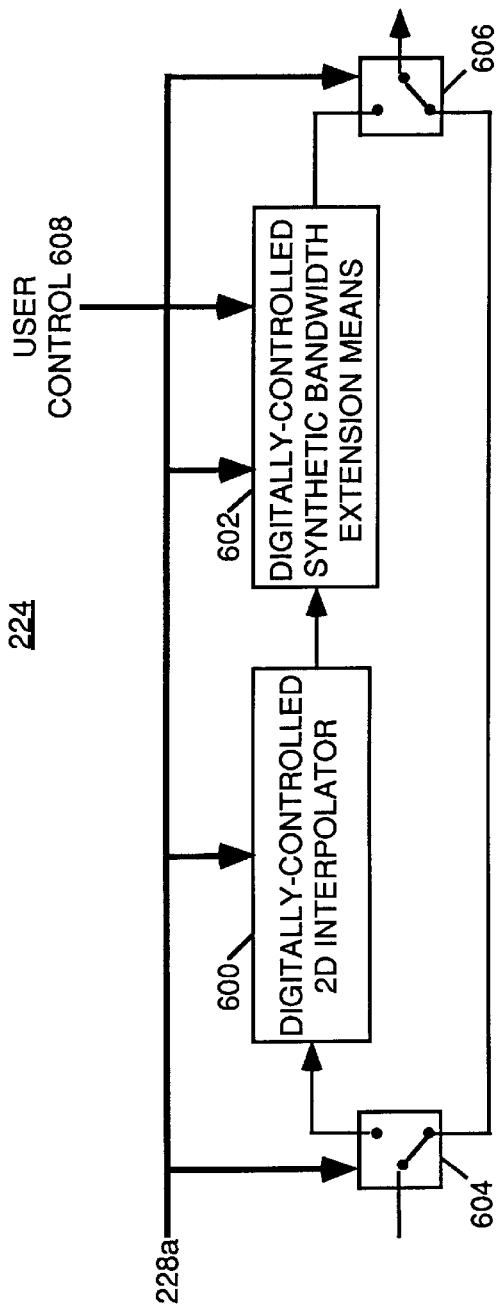

PROCESSING APPARATUS FOR USE IN REDUCING VISIBLE ARTIFACTS IN THE DISPLAY OF STATISTICALLY COMPRESSED AND THEN DECOMPRESSED DIGITAL MOTION PICTURES

BACKGROUND

1. Field of the Invention

This invention relates to (1) pre-processing techniques for reducing the image spatial bandwidth of original digital motion pictures, to thereby reduce the overall encoded compressed data required to be forwarded to a decoder for decompressing the encoded compressed data, together with (2) post-processing techniques for synthetically extending the image spatial bandwidth of the decompressed digital motion pictures from the decoder.

2. Description of the Prior Art

As known, there are many popular still image and motion image encoding schemes presently in use, such as MPEG-1, 2, 4, & 7, JPEG, CD-i, H.261, and M-JPEG. The advantage of these algorithms is that they all are agreed upon worldwide standards, offer various compression ratios for various applications, and do their best to preserve image quality. Although all these schemes are considered very technologically advanced, they still introduce some level of image artifacts, which are often above visible threshold.

In particular, MPEG (Motion Picture Experts Group) encoding for motion video accomplishes image data compression by encoding both the motion and spatial redundancies in moving images in a cooperative way. The amount of data necessary to represent a series of image frames depends greatly on the statistics of the image sequence, and is not fixed by the input image resolution, the level of quantization of the image samples, or the number of frames per second. Therefore, the actual output data rate represents an average number of bits per image computed and based upon a specific sample set of image frames. More specifically, transmission channel bandwidth is a statistical function based on the averaged characteristics of the following three MPEG encoding components of a sequence or group of pictures (GOP):

(1) a motion-encoding component of MPEG, which is based on comparing 'macro blocks' in successive video frames and determining where there are redundancies (wherein a macro block typically comprising a 16×16 block of pixels) If they were the same, similar macro blocks in successive frames would not be re-coded, but instead, repeated and/or predicted based on motion estimation or MCP (block-based motion compensated prediction);

(2) a spatial-encoding component of MPEG, which is used to reduce redundancies by comparing neighboring macro blocks using the discrete cosine transform (DCT) to track changes in luminance and chrominance. Typically, picture data is block coded using a two-dimensional 8×8 DCT. The sixty three coefficients are mapped into a zigzag pattern, quantized, run-length coded, and Huffman coded; and (3) a spatial-frame-redundancy component of MPEG, which is used to reduce data by one-dimensional differential pulse-code modulation (DPCM) coding of the zero-frequency or DC coefficients of frames, then quantization, and finally entropy coding. The amount of motion and high frequency information largely determine the bulk of data required to code a series of frames.

At the current level of technology, most hybrid types of "entropy-quantization" algorithms generally perform transparently at compression ratios of 10:1 or less. Unfortunately, many applications require much higher compression ratios, where under these conditions numerous artifacts may become visible. These artifacts often include Gibbs phenomenon, blockiness, posterization, checker boarding, and color bleeding.

Regardless of whether it is transmission channel bandwidth, the number of gigabits found on a DVD CD-ROM, or computer disk transfer rate, there is never more bandwidth for free. Therefore, normally, the image transmission bandwidth is the limiting factor in overall image quality because of the substantially large cost of providing greater image transmission. For this reason, in MPEG and like systems, a compromise is usually made between how 'quantized' the encoded image pixels are and how much motion change needs to be coded. This trade is a balancing of image statistics to keep the overall average bit rate lower than the channel bandwidth, so that an output image can always be reconstructed and the viewer maintains a picture on the screen.

There are many ways used by the prior art to reduce MPEG based encoded data rates. Typically, all these ways strive to remove all data redundancies and, assuming the algorithm employed is sound and the encoder employed provides a faithful implementation of the employed algorithm, there is little else to gain in coding efficiency. For example, a first prior-art solution to reduce overall channel bandwidth is to reduce the number of input samples that the encoder needs to process by starting with a smaller size input image, as described in "What is MPEG?" by Mark Adler, dated Oct. 19, 1992, which is published in MPEG-FAQ 4.1. A smaller input image containing fewer pixels would naturally take fewer bits to encode. A second prior-art solution to reduce overall channel bandwidth is to pre-filter the input image by some fixed amount, as described in "What is MPEG-2?" by Chad Fogg, dated May 11, 1995, which is published in MPEG-FAQ 4.1. The image would then contain less high frequency, and, therefore, would command a lower Nyquist sampling rate. Thus, the encoder could theoretically represent the image with fewer bits The pre-filtered image has less high frequency information, and the encoder would see fewer high frequency edges and also likely detect less motion. However, viewing a smaller size image (as suggested by the first prior-art solution) or a more blurred image (as suggested by the second prior-art solution) would not be considered an improvement in system image quality. So these first and second prior-art solutions are not optimal.

There are many observed cases in current MPEG applications where pixelization from over quantizing in high motion sequences already occurs and produces visible artifacts. This occurs because the encoder is economized and is operating near the limit of its abilities, and when occasionally it cannot compress enough the limit of the transmission channel is exceeded.

At this point, the question is what else might be done to either further reduce the coded data rate and/or how can the level of perceived image artifacts be reduced? In this regard, reference is made to the teachings of each of our two earlier U.S. Pat. No. 5,355,328 (which issued Oct. 11, 1994 and is entitled "Resampling Apparatus Suitable For Resizing a Video Image") and U.S. Pat. No. 5,483,474 (which issued Jan. 9, 1996 and is entitled "D-Dimensional Fractional Bandwidth Signal Processing Apparatus"), and to the teaching of our copending patent application Ser. No. 09/112539 (which was filed Jul. 9, 1998, is entitled "Processing Apparatus for Synthetically Extending the Bandwidth of a Spatially-Sampled Video Image" and is assigned to the same assignee as the present invention). The respective teachings of each of these two patents and this patent application are incorporated herein by reference.

SUMMARY OF THE INVENTION

The present invention is directed to an improvement in a compressed data system for communicating high spatial-frequency content of original frames of a digital motion picture over a limited-bandwidth transmission channel which, while preventing the bandwidth of the compressed data from ever exceeding the limited bandwidth of the transmission channel, still permits these communicated frames, after being received and decompressed, to substantially retain their high spatial-frequency content. This is achieved by employing a pre-processor that includes first digitally-controlled means, responsive to a digital control value of a first digital control signal being applied as a control input thereto which is indicative of the bandwidth of the compressed content exceeding the limited bandwidth of the transmission channel, for reducing the spatial bandwidth of the content of each of original frame by a selected amount which is sufficient to maintain the bandwidth of the compressed content within the limited bandwidth of said transmission channel, and the first digitally-controlled means derives a second digital control signal comprising one or more digital control values indicative of those operations performed by the first digitally-controlled means in reducing the spatial bandwidth of the content of each of original frame by said selected amount, the second digital control signal being communicated over the limited-bandwidth transmission channel to a post-processor which includes second digitally-controlled means responsive to the one or more second digital control values of the second digital signal communicated thereto for synthetically extending the reduced spatial bandwidth of such a reduced-spatial-frequency frame at the output from a compression decoder to substantially increase the spatial bandwidth of the content of that original frame.

BRIEF DESCRIPTION OF THE DRAWING

FIG. 1a is a functional block diagram of the transmitter of the compressed-data system of FIG. 1;

FIG. 1b is a functional block diagram of the receiver of the compressed-data system of FIG. 1;

FIG. 2a is a functional block diagram of the transmitter of the compressed-data system of FIG. 2;

FIG. 2b is a functional block diagram of the receiver of the compressed-data system of FIG. 2;

FIG. 6 is a functional block diagram of a first embodiment of the post-processor of the compressed-data system of FIG. 2 for the case in which the compressed-data system employs either the first embodiment of the pre-processor shown in FIG. 3 or the third embodiment of the pre-processor shown in FIG. 5;

FIG. 6a is a functional block diagram of a second embodiment of the post-processor of the compressed-data system of FIG. 2 for the case in which the compressed-data system employs the second embodiment of the pre-processor shown in FIG. 4;

FIG. 7 is a block diagram of a preferred embodiment of the digitally-controlled 2D interpolation means of FIG. 6 (which preferred embodiment comprises a modification of the preferred embodiment of the 2D interpolation means shown in FIG. 7 of our aforesaid earlier U.S. Pat. No. 5,355,328) for the case in which the pre-processor of the compressed-data system employs the preferred embodiment of the digitally-controlled reduce-size 2D resampler shown in FIG. 3a;

DESCRIPTION OF THE PREFERRED EMBODIMENTS

Figure 1:
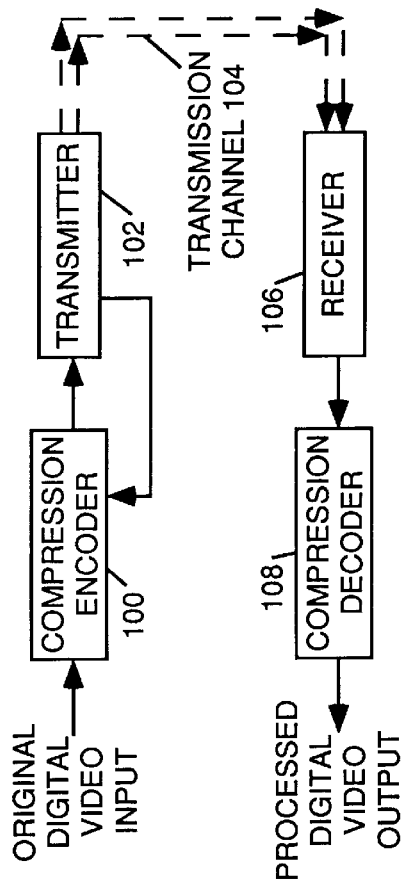
FIG. 1 is a functional block diagram of a prior-art compressed-data system for transmitting motion-picture digital video information over a limited-bandwidth transmission channel.

As functionally shown in FIG. 1, a prior-art compressed-data system for transmitting motion-picture digital video information over a limited-bandwidth transmission channel comprises compression encoder 100, transmitter 102, limited-bandwidth transmission channel 104, receiver 106 and compression decoder 108. An ongoing digital data stream of bits defining the image of each successive frame of motion-picture information which is two-dimensionally (2D) scanned at a specified frame rate is applied as an original digital video input to compression encoder 100. More particularly, the image defined by each successively-scanned frame is spatially sampled at a given sampling rate to provide successive pixel samples, with the magnitude value of each individual pixel sample being quantized in accordance with a given multibit code comprising a specified number of bits (e.g., 8 bits, by way of example).

From a statistical point of view, it is usually sufficient for compression encoder 100 to encode only the motion and spatial redundancies in moving images in a cooperative way to maintain the data rate needed to be transmitted from transmitter 102 over limited-bandwidth transmission channel 104 to receiver 106 within the limited bandwidth of transmission channel 104. Thus, in this usual case, there is no necessity to compress (i.e., reduce) the number of bits of the quantization multibit code from the specified number of bits. This is desirable because the need to reduce the number of bits of the quantization multibit code would have the tendency of increasing the visibility of artifacts introduced into the display of motion pictures defined by the decompressed processed digital video output from compression decoder 108.

However, as motion change increases, there may be a need to compress the number of bits of the quantization multibit code in order to maintain the overall average bit rate lower than the limited bandwidth of transmission channel 104. In this regard, FIGS. 1 and 1a, together, show (1) that transmitter 102 preferably comprises data buffer 110, data packetizer 112 and data modulator 114, and (2) data buffer 110 of transmitter 102 derives a control signal which is fed back to compression encoder 100 to control the compression of the quantization multibit code. More particularly, this control signal is indicative of the extent to which data buffer 110 is filled at any time. If data buffer 110 is becoming too filled, indicative of the fact that the average rate of applying compressed bits from the output of compression encoder 100 to the input of data buffer 110 of transmitter 102 is likely to exceed the average rate of forwarding compressed bits from the output of data buffer 110 of transmitter 102 to the limited-bandwidth transmission channel 104 (after having been first packetized by data packetizer 112 and then being used by data modulator 114 as a modulating signal for a data carrier), compression encoder 100 reacts to the control signal from data buffer 110 by compressing the quantization multibit code so that the bandwidth limit of transmission channel 104 is not exceeded. However, there are still cases in which compression encoder 100 is economized and is operating near the limit of its abilities, so that, in these cases, when occasionally it cannot compress enough, the bandwidth limit of transmission channel 104 is exceeded.

As known, a data packetizer, such as data packetizer 112, derives successive data packets, wherein each data packet includes a group of encoded video bits preceded by a group of so-called "header" bits. The bits of the "header" of each packet may be used to define such information as the forwarding address to the receiver and/or the respective coefficient values of one or more control settings initially employed by the compression encoder to encode the video bits of that transmitted packet, wherein this coefficient-value information must be communicated to the compression decoder for proper decoding of the encoded video bits of that received packet to take place.

More particularly, as shown in FIG. 1b, receiver 106 comprises data demodulator 116, which demodulates the modulated bit-packets of data forwarded over limited-bandwidth transmission channel 104 to the input thereof, and data buffer 118, which forwards the demodulated bit-packets of data from the output thereof to data depacketizer 120. The resulting depacketized data bits from the output of depacketizer 120 are then applied as the output of receiver 106 to the input of compression decoder 106, as shown in FIG. 1. Should the demodulated bit-packets of data comprise "header" bits defining the aforesaid coefficient values of one or more control settings, the depacketized data bits which define the aforesaid coefficient values of one or more control settings needed by compression decoder 106 are included in the depacketized data bits which are applied as the output of receiver 106 to the input of compression decoder 106.

It is apparent that it the limited bandwidth of the transmission channel that acts as a "bottle neck" which limits the maximum amount of motion picture information that can be communicated per unit time between a video transmitter and a video receiver by a prior-art data compression system, such as exemplified by the above-described prior-art data compression system shown in FIGS. 1, 1a and 1b. The present invention substantially reduces the negative effects caused by the "bottle neck" due to the limited bandwidth of the transmission channel.

Figure 2:
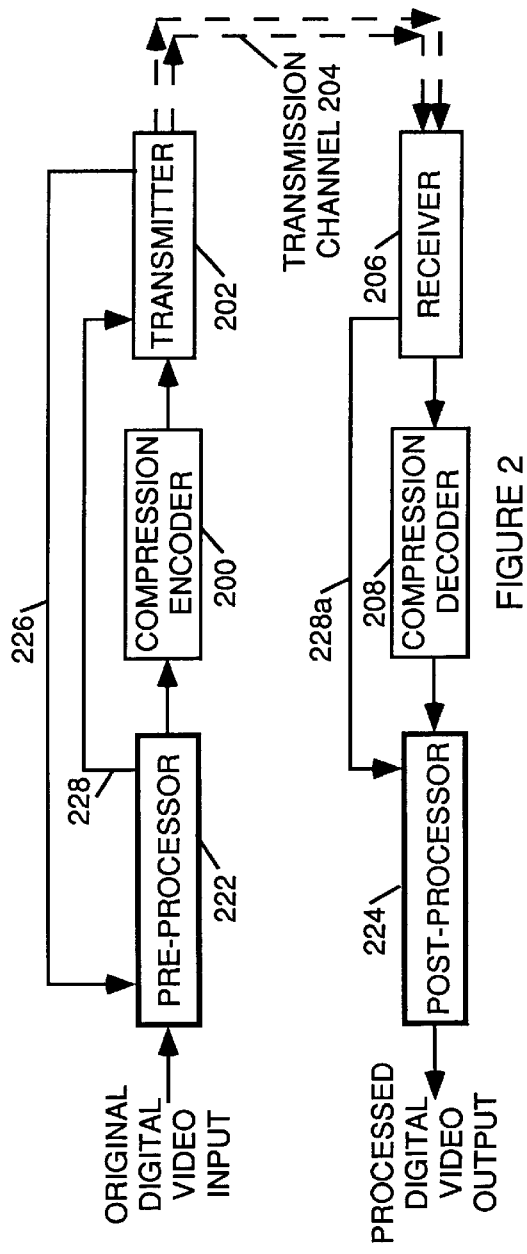
FIG. 2 is a functional block diagram of the compressed-data system of the present invention for transmitting motion-picture digital video information over a limited-bandwidth transmission channel.

Referring now to the compressed-data system of the present invention shown in FIG. 2, the elements comprising compression encoder 200, transmitter 202 (shown in more detail in FIG. 2a), limited-bandwidth transmission channel 204, receiver 206 (shown in more detail in FIG. 2b) and compression decoder 208 are, for the most part, similar in structure and function to the corresponding elements comprising compression encoder 100, transmitter 102, limited-bandwidth transmission channel 104, receiver 106 and compression decoder 108 of the prior-art compressed-data system shown in FIG. 1. However, the compressed-data system of the present invention shown in FIG. 2 differs from the prior-art compressed-data system shown in FIG. 1 in that (1) the original digital video input is pre-processed by pre-processor 222 in FIG. 2 before being applied as an input to compression encoder 200, rather than being directly applied as an input to compression encoder 100 (as shown in FIG. 1), and (2) the processed digital video output is derived by post-processing the output from compression decoder 208 in post-processor 224 of FIG. 2, rather than being directly derived as the output from compression decoder 108 (as shown in FIG. 1).

Three alternative embodiments of pre-processor 222 and an embodiment of post-processor 224 are described in detail below. However, in any case, pre-processor 222 serves the function, when necessary, of being able to reduce the 2D video-image-frame spatial frequency bandwidth at any time by an amount determined by the value of first digital control signal 226 fed back thereto from data buffer 210 of transmitter 202, which fed-back first digital control signal 226 value is indicative of the extent to which data buffer 210 is filled at that time. Further, pre-processor 222 derives second digital control signal 228 defining one or more values indicative of the operation of pre-processor 222, which second digital control signal 228 is forwarded to data packetizer 212 of transmitter 202. The current second digital control signal 228 values, which are incorporated by data packetizer 212 in the header information of each successive packet, is communicated to data depacketizer 220 of receiver 206 through data modulator 214 of transmitter 202, limited-bandwidth transmission channel 204 and data demodulator 216 and data buffer 218 of receiver 206. The current values of digital control signal 228a, recovered from the depacketized "header" information in depacketizer 220, are identical to the current second digital control signal 228 values which were incorporated by data packetizer 212 in the header information of each successive packet. Digital control signal 228a is then forwarded to post-processor 224. Post-processor 224, in response to the one or more values defined by digital control signal 228a, is effective in substantially restoring the image-frame spatial frequency bandwidth of the processed digital video output of post-processor 224 to that of the original digital video input applied to pre-processor 222.

Figure 3:
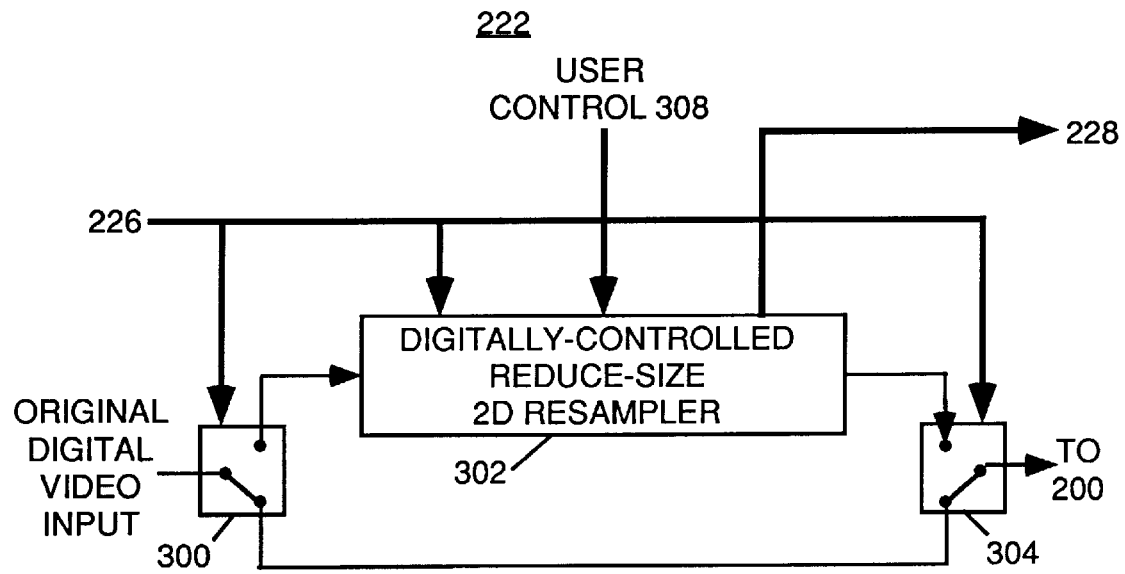
FIG. 3 is a functional block diagram of a first embodiment of the pre-processor of the compressed-data system of FIG. 2.

As shown in FIG. 3, the first embodiment of pre-processor 222 comprises input digitally-controlled switch 300, digitally-controlled reduce-size 2D resampler 302 and output digitally-controlled switch 304. First digital control signal 226 (which is shown with a thick line) is applied as a control input to each of input digitally-controlled switch 300, digitally-controlled reduce-size 2D resampler 302 and output digitally-controlled switch 304. Second digital control signal 228 (which is also shown with a thick line) is applied as a control output from digitally-controlled reduce-size 2D resampler 302. While the resampler of digitally-controlled reduce-size 2D resampler 302 may employ the prior-art teaching disclosed in the aforementioned Mark Adler article to reduce the number of input samples that the encoder needs to process by starting with a smaller size input image, preferably the resampler of digitally-controlled reduce-size 2D resampler 302 employs reduce-size 2D resampler 306 shown in FIG. 3a, which employs the prior-art teaching disclosed in our aforementioned earlier U.S. Pat. No. 5,355,328 to reduce the size of each of the dimensions of the input image by a factor 1/C=N/M, where M>N (each of M and N being a positive integer). Therefore, in a first case in which N has a value equal to 1, C is a positive integer equal to M; while, in a second case in which N has a value larger than 1, C is a is an improper fraction equal to M/N. Thus, the reduction in the size of each of the 1/C dimensions of the input image derived by reduce-size 2D resampler 306 may have any selected proper-fractional value N/M (i.e., is not limited to the case in which C is a positive integer). Further, the reduction in horizontal and vertical dimensions of the input image need not be the same. In this last case, the selected value of C for the horizontal dimension would be different from the selected value of C for the vertical dimension.

As long as the value of first digital control signal 226 fed back from data buffer 210 of transmitter 202 (shown in FIG. 2a) is indicative of data buffer 210 remaining below a threshold value, digitally-controlled switches 300 and 304 remain in their default lower switch position (shown in FIG. 3), so that the original digital video input, applied as an input to digitally-controlled switch 300, is directly forwarded as an output from digitally-controlled switch 304 as an input to compression encoder 200 (shown in FIG. 2a). However, whenever the value of first digital control signal 226 is equal to or above this threshold value, digitally-controlled switches 300 and 304 are operated to their upper switch position, so that now the original digital video input is forwarded as an input to digitally-controlled reduce-size 2D resampler 302 and the output from digitally-controlled reduce-size 2D resampler 302 is forwarded as an input to compression encoder 200. In practice, digitally-controlled switches 300 and 304 may comprise a ganged switch assembly employing a common switch-control means. Further, the particular value (equal to or above this threshold value) of first digital control signal 226, applied as a control input to digitally-controlled reduce-size 2D resampler 302, may be used to digitally control the parameter values (e.g., C, N and or M) employed at that time by digitally-controlled reduce-size 2D resampler 302, and hence the amount of reduction in the video size provided by the 2D resampled output from resampler 302. In addition, if desired, digital control by user control 308 may be used to modify or replace the digital control of the parameter values that have been determined by the value of the first digital control signal 226.

Figure 4:
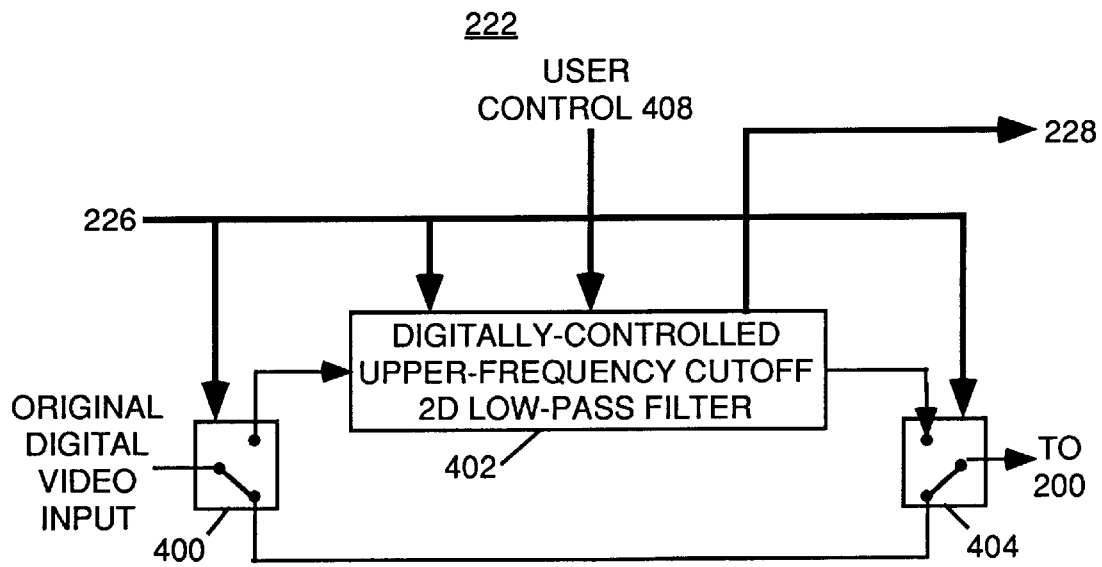
FIG. 4 is a functional block diagram of a second embodiment of the pre-processor of the compressed-data system of FIG. 2.
Figure 4A:
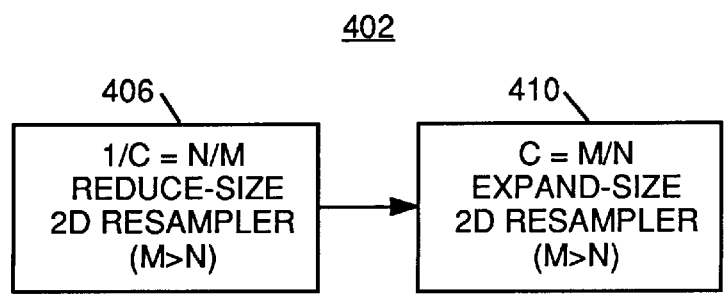
FIG. 4a shows a preferred embodiment of the digitally-controlled upper-frequency cutoff 2D low-pass filter of FIG. 4.

As shown in FIG. 4, the second embodiment of pre-processor 222 comprises input digitally-controlled switch 400, digitally-controlled upper-frequency cutoff 2D low-pass filter 402 and output digitally-controlled switch 404. First digital control signal 226 (which is shown with a thick line) is applied as a control input to each of input digitally-controlled switch 400, digitally-controlled upper-frequency cutoff 2D low-pass filter 402 and output digitally-controlled switch 404. Second digital control signal 228 (which is also shown with a thick line) is applied as a control output from digitally-controlled upper-frequency cutoff 2D low-pass filter 402. Preferably, digitally-controlled upper-frequency cutoff 2D low-pass filter 402 employs the combination of reduce-size 2D resampler 406 and expand-size 2D resampler 410 shown in FIG. 4a, which employs the prior-art teaching disclosed in our aforementioned earlier U.S. Pat. No. 5,483,474. Since resampler 410 expands the video size by the same amount that the video size has been reduced by resampler 406, a digitally-controlled upper-frequency cutoff 2D low-pass filter 402 implemented by the combination of reduce-size 2D resampler 406 and expand-size 2D resampler 410 results in no net change in video size between the input and output thereof. However, the upper-frequency cutoff from the low-pass filtering effect that is inherent in the operation of resampler 406 is not and cannot be compensated for by the subsequent in the operation of resampler 410.

Each of elements 400, 404 and 408 of the second embodiment of pre-processor 222 is similar in all material respects to its corresponding one of elements 300, 304 and 308 of the first embodiment of pre-processor 222 described in detail above.

Figure 5:
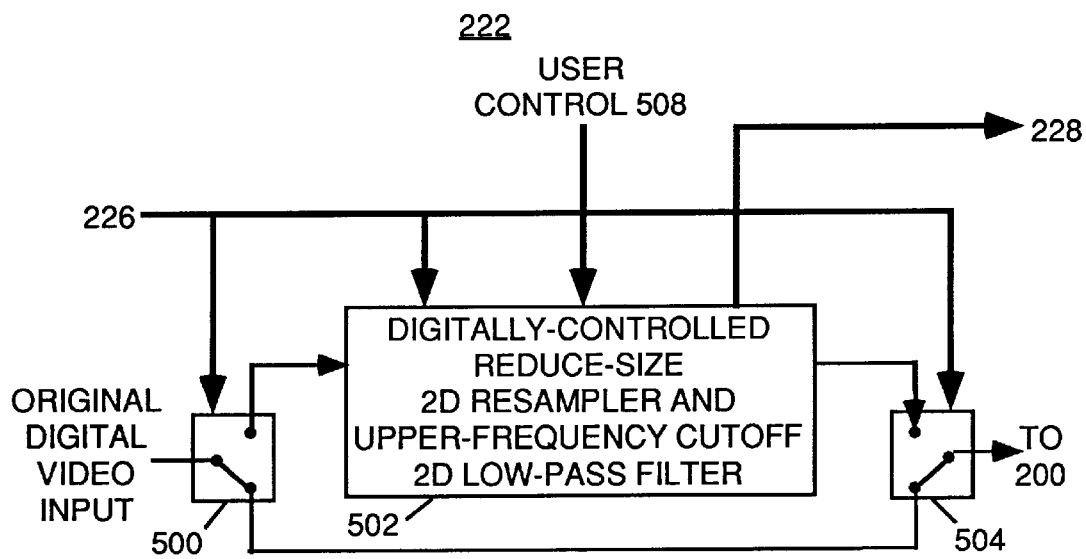
FIG. 5 is a functional block diagram of a third embodiment of the pre-processor of the compressed-data system of FIG. 2.

The third embodiment of pre-processor 222, shown in FIG. 5, which comprises input digitally-controlled switch 500, digitally-controlled reduce-size 2D resampler and upper-frequency cutoff 2D low-pass filter 502 and output digitally-controlled switch 504, functions as an amalgam of the functions performed by the first and second embodiments of pre-processor 222, shown, respectively, in FIGS. 3 and 4. Preferably, digitally-controlled reduce-size 2D resampler and upper-frequency cutoff 2D low-pass filter 502 employs the combination of reduce-size 2D resampler 506 and expand-size 2D resampler 510 shown in FIG. 5a. It should be noted that resampler 506 reduces size by a factor $1/C_1$ while resampler 510 expands size by a factor $1/C_2$, where $C_1 > C_2$. Therefore, digitally-controlled reduce-size 2D resampler and upper-frequency cutoff 2D low-pass filter 502 is effective in reducing the video size by only a smaller factor $C_2/C_1$ than the factor $1/C_1$, while still providing the relatively large drop in upper-frequency cutoff determined by the factor $1/C_1$.

Each of elements 500, 504 and 508 of the third embodiment of pre-processor 222 is similar in all material respects to its corresponding one of elements 300, 304 and 308 of the first embodiment of pre-processor 222 described in detail above.

The common function performed by each of the above-described first, second and third embodiments of pre-processor 222 is to reduce only that portion of the overall frequency bandwidth of the applied original digital video input defining the picture information contained in the ongoing video frames of a motion picture which is due to the spatial-frequency bandwidth of each one, per se, of these ongoing video frames. Thus, the function performed by each of the above-described first, second and third embodiments of pre-processor 222 has no direct effect on the temporal-frequency bandwidth portion of the overall frequency bandwidth of the applied original digital video input due to the value of the motion-picture frame rate defined thereby. However, the reduction in spatial-frequency bandwidth of each one, per se, of the ongoing video frames permits a value of the motion-picture frame rate to be made higher than it otherwise could be without exceeding the limited-bandwidth capability of transmission channel 204.

A first embodiment of post-processor 224, shown in FIG. 6, is suitable for use wherein pre-processor 222 employs either the first embodiment thereof shown in FIG. 3 or the third embodiment thereof shown in FIG. 5 to effect thereby a resultant reduction in video size, while a second embodiment of post-processor 224, shown in FIG. 6a, is suitable for use wherein pre-processor 222 employs the second embodiment thereof shown in FIG. 4 in which no resultant reduction in video size has been effected thereby.

As indicated in FIG. 6, the first embodiment of post-processor 224 comprises digitally-controlled 2D interpolator 600, digitally-controlled synthetic bandwidth extension means 602, input digitally-controlled switch 604 and output digitally-controlled switch 606. Each of digitally-controlled elements 600, 602, 604 and 606 are digitally controlled in accordance with the one or more current values of digital control signal 228a applied as a control input to each of them. In particular, each of digitally-controlled switches 604 and 606 remains in its default lower switch position (shown in FIG. 6) unless a first one of the one or more current values of digital control signal 228a is indicative of pre-processor 222 having been operated to derive a reduced-size image. In their default lower switch positions, switches 604 and 606 directly forward the output of compression decoder 208 as the processed digital video output from post-processor 224. However, whenever the a first one of the current values of digital control signal 228a is indicative of a reduced-size image having been derived, switches 604 and 606 are operated to forward the output of compression decoder 208 through digitally-controlled 2D interpolator 600 and digitally-controlled synthetic bandwidth extension means 602 to thereby derive the processed digital video output from post-processor 224.

Others of the current values of digital control signal 228a may be applied to (1) digitally-controlled 2D interpolator 600 to provide an expansion in image size that just matches the current reduction in image size that has been undergone in pre-processor 222 (e.g., C=M/N in the FIG. 3a case and $C_1/C_2$ in the FIG. 5a case) and (2) digitally-controlled synthetic bandwidth extension means 602 to provide an amount of extension in image spatial bandwidth that just compensates for the amount of reduction in image spatial bandwidth undergone by the current operation of pre-processor 222. However, if desired, user control 608 is available to provide digital control values which may be used by the user to modify or replace the current values of digital control signal 228a.

Figure 3A:
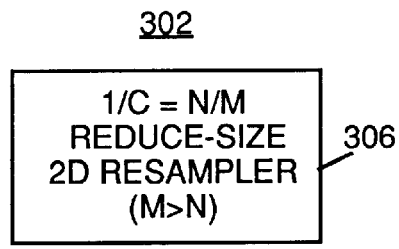
FIG. 3a shows a preferred embodiment of the digitally-controlled reduce-size 2D resampler of FIG. 3.
Figure 7:
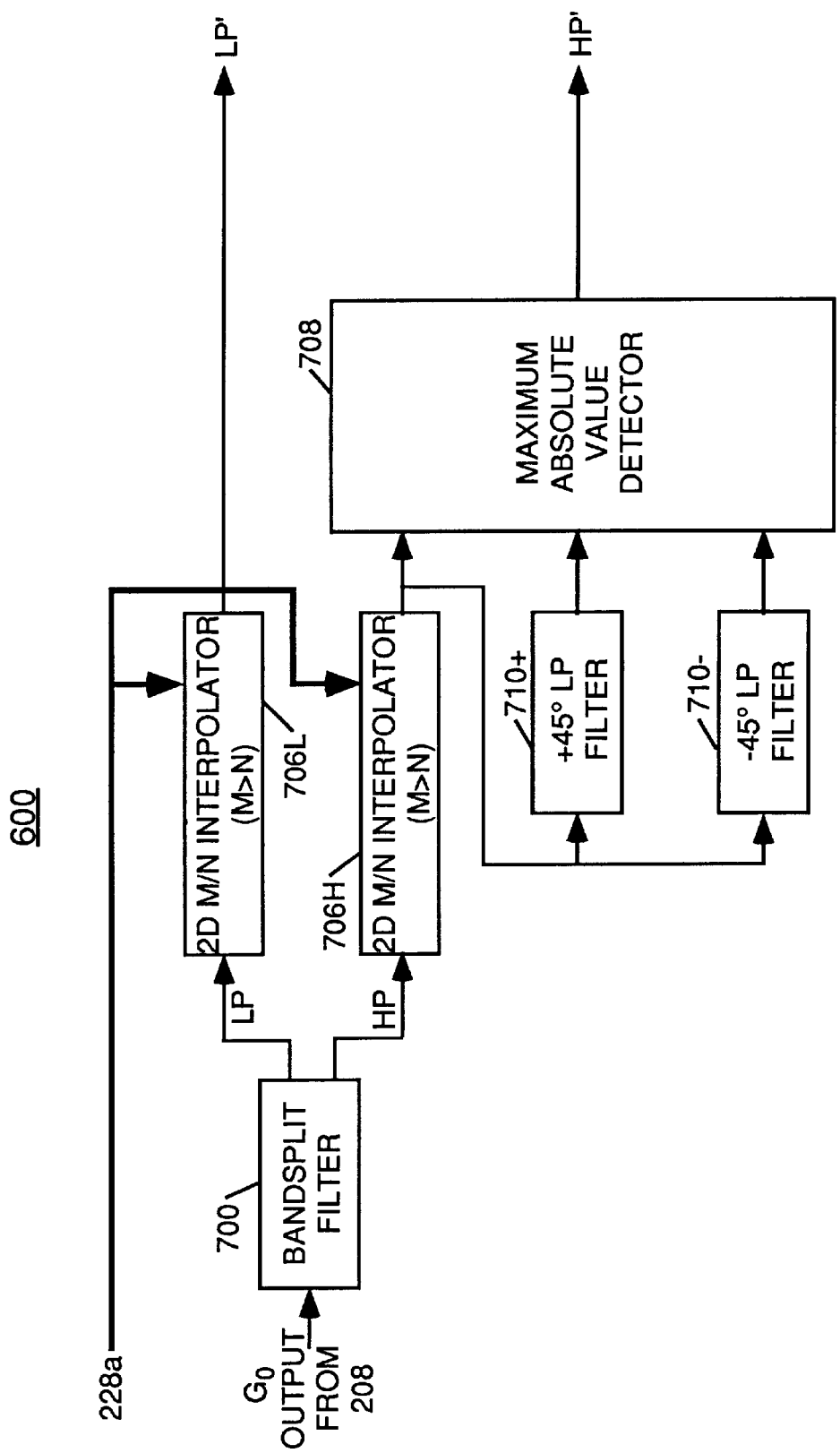

By way of example, a first preferred embodiment of digitally-controlled 2D interpolator 600, suitable for the C=M/N case of FIG. 3a, is shown in FIG. 7 (which preferred embodiment comprises a modification of the preferred embodiment of the 2D interpolation means shown in FIG. 7 of our aforesaid copending patent application Ser. No. 09/112539).

In FIG. 7, the image output data stream $G_0$ from compression decoder 208 is applied as an input to bandsplit filter 700, which divides the overall 2D spatial frequency band of $G_0$ into a low-pass (LP) band and a high-pass (HP) band. The LP and HP outputs from bandsplit filter 700 are applied, respectively, as inputs to digitally-controlled 2D interpolators 706L and 706H, which for illustrative purposes are assumed to be basically similar to the interpolators of the type disclosed in our earlier U.S. Pat. No. 5,355,328 that is capable of enlarging an image by a factor which may be either a whole number or an improper fraction M/N, where M>N. However, in the case of digitally-controlled 2D interpolators 706L and 706H, the respective adjustable values of M and N are determined by those certain ones of the current values of digital control signal 228a applied as a control input to each of digitally-controlled 2D interpolators 706L and 706H. The successive pixels of the increased 2D spatial sampling frequency data stream output from interpolator 706L constitutes the LP' output from interpolation means 600. However, the successive pixels of the increased 2D spatial sampling frequency data stream output from interpolator 706H are applied, respectively, as a first input to maximum absolute value detector 708, as an input to +45° LP filter 710+ and as an input to −45° LP filter 710−. The output from +45° LP filter 710+ is applied as a second input to maximum absolute value detector 708 and the output from −45° LP filter 710− is applied as a third input to maximum absolute value detector 708. Detector 708 performs the function of comparing the relative absolute values of each successive group of three pixels concurrently applied as the first, second and third inputs to detector 708 and forwarding as an output from to detector 708 that one of the three pixels from each successive group that has been found to have the maximum absolute value. The successive pixels of the increased 2D spatial sampling frequency data stream output from detector 708 constitutes the HP' output from interpolation means 600.

Each of +45° LP filter 710+ and −45° LP filter 710− is preferably a 3-tap filter. However, alternatively, each of +45° LP filter 710+ and −45° LP filter 710− could be a more complex LP filter having more than three taps. As known, the value of each pixel at the output a 3-tap +45° LP filter is the sum of (1) ¼ the value of its concurrent pixel of the data stream input to the filter, (2) ½ the value of that pixel of the data stream input that has undergone a delay of one scanline plus one pixel, and (3) ¼ the value of that pixel of the data stream input that has undergone a delay of two scanlines plus two pixels. The value of each pixel at the output a 3-tap −45° LP filter is the sum of (1) ¼ the value of its concurrent pixel of the data stream input to the filter, (2) ½ the value of that pixel of the data stream input that has undergone a delay of one scanline minus one pixel, and (3) ¼ the value of that pixel of the data stream input that has undergone a delay of two scanlines minus two pixels.

The interpolation process by interpolator 706H inherently results in significant blurring of vertical and horizontal edges (but only slight blurring of diagonal edges) of the enlarged image defined by the data stream output from interpolator 706H applied as a first input to detector 708. However, diagonal edges of the enlarged image defined by the data stream outputs from +45° LP filter 710+ and −45° LP filter 710− applied, respectively, as a second and third inputs to detector 708 are blurred. This insures that all edges of the enlarged image defined by the data stream output HP' from detector 708 (regardless of the angular orientation of an edge in the enlarged image) will be significantly blurred. Therefore, any jagged diagonal edge occurring in the enlarged image defined by the data stream output from interpolator 706H will be eliminated in the significantly blurred corresponding diagonal edge of the enlarged image defined by the data stream output HP'. The capability of eliminating jagged diagonal edges in the enlarged image is one benefit of the present invention. However, it is still necessary to remove the blur of all edges of the enlarged image defined by the data stream output HP' in order to achieve edges in the enlarged image that are sharp, as desired. Sharpening of the blurred edges is accomplished by synthetic bandwidth extension means 602, to which the LP' and HP' outputs from 2D interpolation means 600 are applied as inputs to means 602.

Figure 5A:
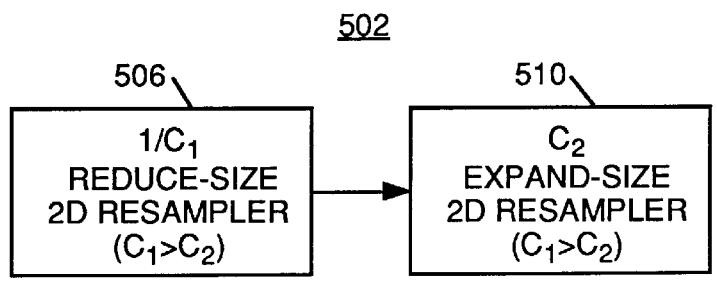
FIG. 5a shows a preferred embodiment of the digitally-controlled reduce-size 2D resampler and upper-frequency cutoff 2D lowpass filter of FIG. 5.

A second preferred embodiment of digitally-controlled 2D interpolator 600, suitable for the $C_1/C_2$ case of FIG. 5a is obtained by merely substituting a 2D $C_1/C_2$ interpolator for each of the 2D M/N interpolators 706L and 706H of FIG. 7.

Figure 8A:
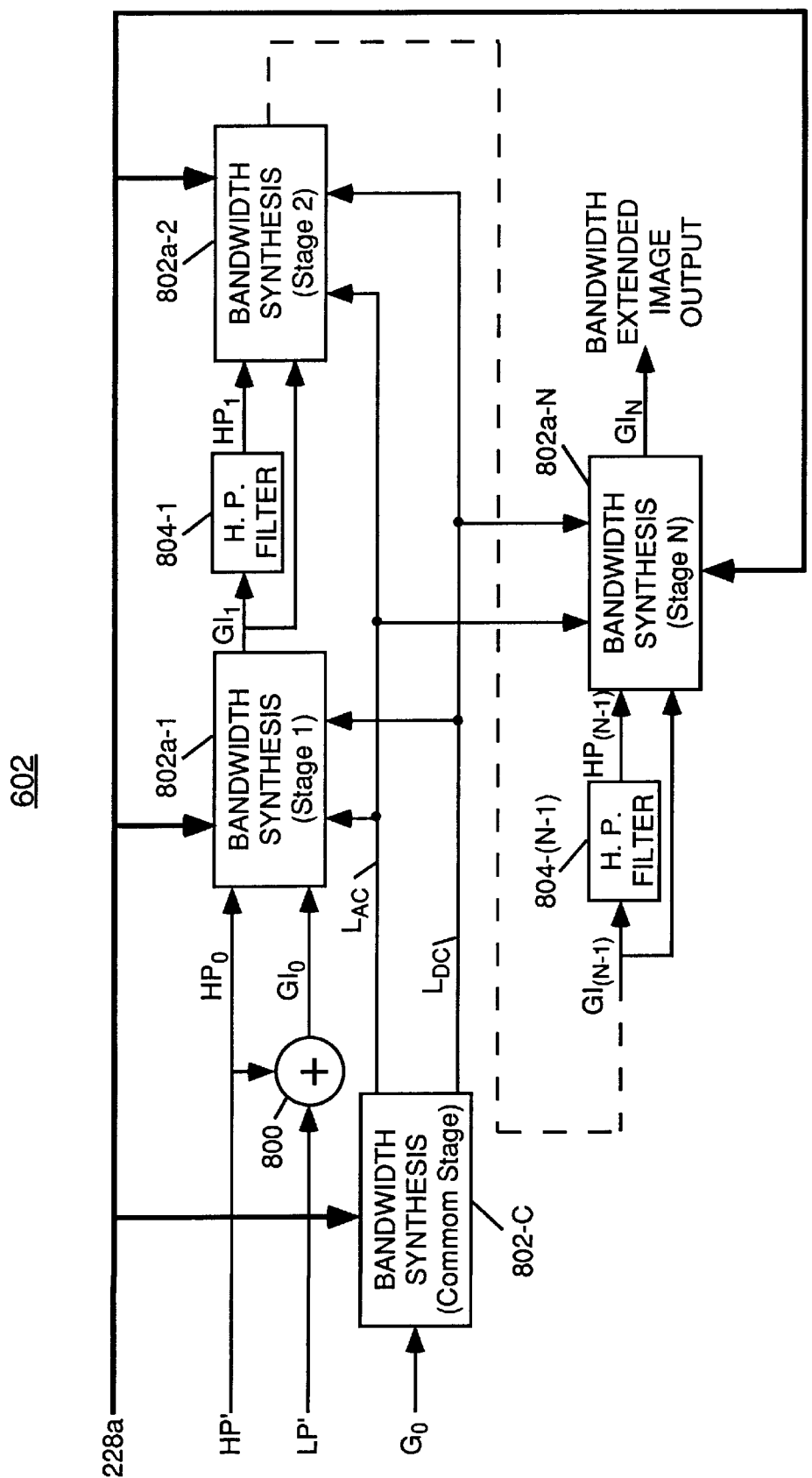
FIGS. 8a and 8b are block diagrams showing, respectively, first and second preferred embodiments of the digitally-controlled synthetic bandwidth extension means of FIGS. 6 and 6a (which preferred embodiments comprise modifications of the first and second preferred embodiments of the synthetic bandwidth extension means shown in FIGS. 8a and 8b of our aforesaid earlier U.S. Pat. No. 5,355,328)

A first preferred embodiment of digitally-controlled synthetic bandwidth extension means 602, which may be employed in combination with either the above-described first or second preferred embodiments of digitally-controlled 2D interpolator 600, is shown in FIG. 8a (which first preferred embodiment of digitally-controlled synthetic bandwidth extension means 602 comprises a modification of the preferred embodiment of the synthetic bandwidth extension means 602 shown in FIG. 8a of our aforesaid copending patent application Ser. No. 09/112539).

FIG. 8a shows summer 800, a common stage for bandwidth synthesis 802-C, an ordinally-arranged set of stages for bandwidth synthesis 802a-1, 802a-2 . 802a-N, and an ordinally-arranged set of HP filters 804-1 . . . 804-(N−1). The image output data stream $G_0$ from compression decoder 208 is applied as an input to common bandwidth synthesis stage 802-C, which derives local AC interpolated-sample data stream $L_{AC}$ and local DC interpolated-sample data stream $L_{DC}$ as outputs therefrom. Common bandwidth synthesis stage 802-C comprises structure including digitally-controlled 2D interpolators that are capable of enlarging an image by the same factor as digitally-controlled 2D interpolators 706L and 706H of FIG. 7 in accordance with the current values of digital control signal 228a applied as a control input to the digitally-controlled 2D interpolators of stage 802-C. Therefore, local AC interpolated-sample data stream $L_{AC}$ and local DC interpolated-sample data stream $L_{DC}$ occur at the same upsampled spatial sampling frequency as the LP' and HP' inputs to FIG. 8a from FIG. 7. Each of data streams $L_{AC}$ and $L_{DC}$ is applied as control inputs to each of bandwidth synthesis stages 802a-1, 802a-2 . . . 802a-N. Further, the HP' and LP' inputs to FIG. 8a are combined by summer 800 to provide full-bandwidth, interpolated-sample data stream $GI_0$ at the output from summer 800. Also the HP' interpolated-sample data stream is applied as a first input $HP_0$ to bandwidth synthesis stage 802a-1, while interpolated-sample data stream $GI_0$ is applied as a second input to bandwidth synthesis stage 802a-1. The output from each of the ordinally-arranged set of bandwidth synthesis stages 802a-1 . . . 802a-(N−1) is applied both directly and through a corresponding ordinal one of the set of HP filters 804-1 . . . 804-(N−1) as inputs to its immediately following ordinal one of the bandwidth synthesis stages 802a-2 . . . 802a-N in the set. The data stream output from bandwidth synthesis stage 802a-N constitutes the bandwidth-extended image output from the first embodiment of synthetic bandwidth extension means 602 shown in FIG. 8a.

Figure 9:
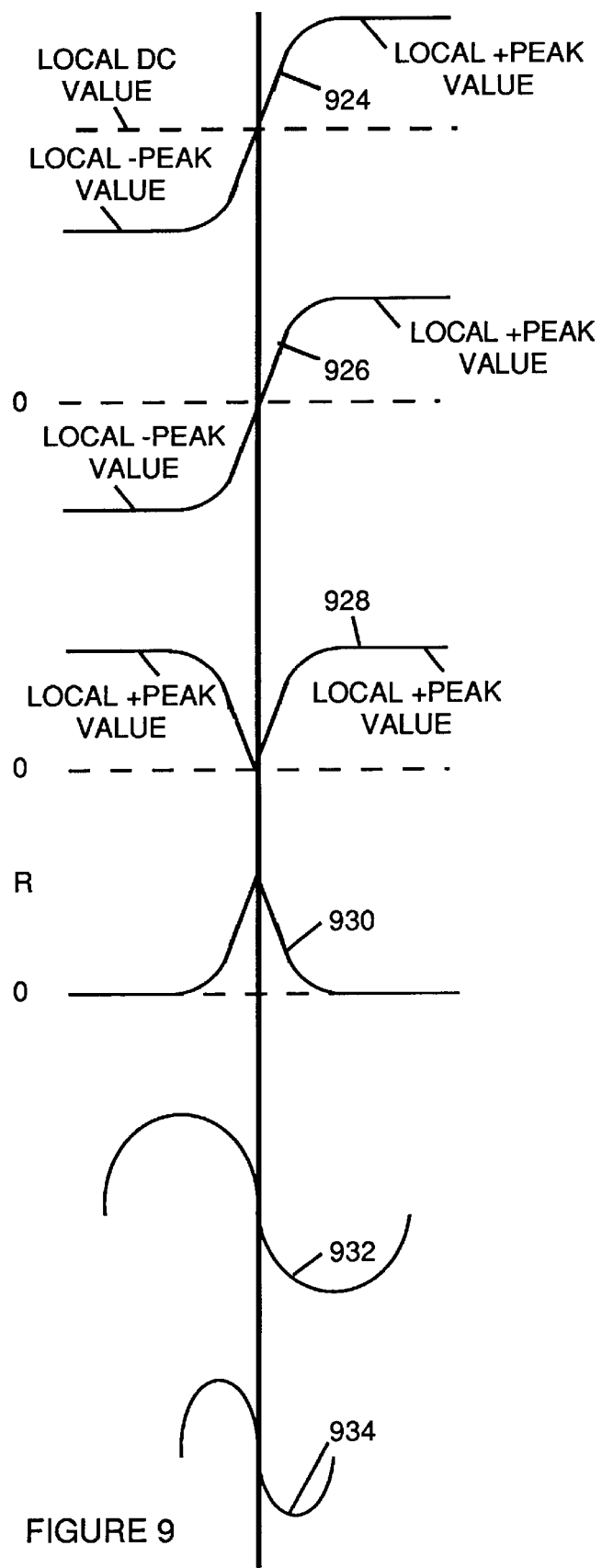
FIG. 9 is directed to an illustrative example of the functional operation of any one of the plurality of N stages shown in either FIG. 8a or 8b.

For details of the structure of common bandwidth synthesis stage 802-C and bandwidth synthesis stages 802a-1 . . . 802a-N, reference may be made to FIG. 9a of our aforesaid copending patent application Ser. No. 09/112539. However, all that is essential for the purposes of the present invention is a description of the functions, shown in FIG. 9, performed by any selected bandwidth synthesis stage 802a-K of bandwidth synthesis stages 802a-1 . . . 802a-N in response to the information provided by all the inputs to that bandwidth synthesis stage.

Assume that a brick-wall edge, having any given angular orientation, separates a relatively darker (i.e., dimmer) area to the left of the brick-wall edge of the original image from a relatively lighter (i.e., brighter) area to the right of the brick-wall edge. 2D interpolation of pixels by interpolators 706L and 706H of FIG. 7 in the local region of the image originally occupied by the brick-wall results in a blurring of this local edge when the LP and HP interpolated data streams are combined into a full-bandwidth interpolated $GI_{k-1}$ data stream.

Referring to FIG. 9, waveform 924 illustrates such a blurred local edge (although the samples defining waveform 924 have been omitted in the showing of waveform 924) defined by interpolated pixels of a local part of the $GI_{k-1}$ data stream input to bandwidth synthesis stage 802a-K. The local AC interpolated-sample data stream $L_{AC}$ input to bandwidth synthesis stage 802a-K defines the local dynamic range (i.e., the difference between the local +peak value and the local −peak value shown by waveform 924). The local DC interpolated-sample data stream $L_{DC}$ input to bandwidth synthesis stage 802a-K defines the local DC value shown by waveform 924 (i.e., the average value, which is ½ way between the +peak value and the local −peak value shown by waveform 924).

Bandwidth synthesis stage 802a-K includes means for subtracting the value of each pixel of the $L_{DC}$ data stream from the value of each corresponding pixel of the $GI_{k-1}$ data stream to thereby eliminate the local DC component, resulting in waveform 926, leaving only the local AC component. Waveform 928 shows the effect of passing the pixels defining waveform 926 through an absolute-value derivation element included in bandwidth synthesis stage 802a-K. Bandwidth synthesis stage 802a-K further includes means to (1) normalize the pixel values forming waveform 926 by dividing each of them by the corresponding pixel value of $L_{AC}$, (2) subtract each normalized pixel value from a "1" pixel value to obtain a difference pixel value, and (3) multiplying each difference pixel value by an adjustable multiplier value defined by digital-control input 228a to bandwidth synthesis stage 802a-K (and/or, if desired, defined by user control 608). The result is to derive pixel values that quickly rise from a zero value to a relatively high maximum value R and then as quickly fall back to a zero value, as indicated by waveform 930. The height of the adjustable multiplier value defined by digital-control input 228a, which determines the size of the maximum value of R, is a function of the size of the bandwidth reduction that occurred in pre-processor 222.

In this regard, for a moment, assume the case in which bandwidth synthesis stage 802a-K is bandwidth synthesis stage 802a-1 (i.e., K=1). In that case, it is the $HP_0$ and $GI_0$ data streams that are applied as interpolated inputs to bandwidth synthesis stage 802a-1. As shown in FIGS. 7 and 8a, the $HP_0$ interpolated data stream (which is identical to the HP' data stream) forwarded as an input to bandwidth synthesis stage 802a-1 is derived, either directly or indirectly through filter 710+ or 710−, from the interpolated output data stream from interpolator 706H. Similarly, the $GI_0$ full-bandwidth data stream is derived through the combined LP' and HP' data streams from the interpolated output data streams from interpolators 706L and 706H. Each of these interpolated output data streams from interpolators 706L and 706H includes highest H and V frequency components. Waveform 932 of FIG. 9 shows the period of one cycle of such a highest frequency component. Bandwidth synthesis stage 802a-1 includes multiplier means for multiplying each of the pixel values of waveform 932 by the corresponding pixel value of waveform 930. Waveform 934 represents the highest frequency component of the interpolated data stream output from this multiplier means for the case in which each pixel value of the $HP_0$ interpolated data stream multiplicand (represented by waveform 932) is multiplied by each corresponding 0-R pixel value of the interpolated data stream multiplier input thereto (represented by waveform 930). It is obvious from FIG. 9 that the period of one cycle of the highest frequency component represented by waveform 934 is shorter than the highest frequency component represented by waveform 932. Therefore, it is plain that the interpolated data stream output from this multiplier means includes synthetically-derived frequency components that are higher than the highest frequency component in either the $HP_0$ or $GI_0$ data stream applied as an interpolated input to bandwidth synthesis stage 802a-1. Further, bandwidth synthesis stage 802a-1 includes summing means for summing the synthetically-derived frequency components included in each of the pixel values of represented by waveform 934 are then added to the corresponding pixel value of the interpolated $GI_0$ data stream to derive the pixel values of the interpolated $GI_1$ data stream at the output from bandwidth synthesis stage 802a-1. Thus, the frequency bandwidth of interpolated $GI_1$ data stream, which constitutes the full-bandwidth output from bandwidth synthesis stage 802a-1, is extended in frequency with respect to the frequency bandwidth of interpolated $GI_0$ data stream, which constitutes the full-bandwidth input to bandwidth synthesis stage 802a-1.

As known, in the Fourier analysis of the frequencies comprising an edge, each successive higher-frequency harmonic has a higher amplitude than its immediately preceding harmonic. To further frequency-extend the synthetically-derived upper frequency components, the pixel values of the interpolated $GI_1$ data stream output from bandwidth synthesis stage 802a-1 are serially passed through each of the set of ordinally-arranged HP filters 804-1 . . . 804-(N–1) and each of the ordinally-arranged set of bandwidth synthesis stages 802a-2 . . . 802a-N to finally derive interpolated $GI_N$ data stream output from bandwidth synthesis stage 802a-N, as shown in FIG. 8a. In practice, a value for N of three is usually sufficient to achieve a bandwidth-extended enlarged digital image with substantially brick-wall edges and smooth (i.e., not jagged or staircase-shaped) diagonally-oriented edges, thereby resulting in a significant improvement in the appearance of an enlarged digital image.

Figure 8B:
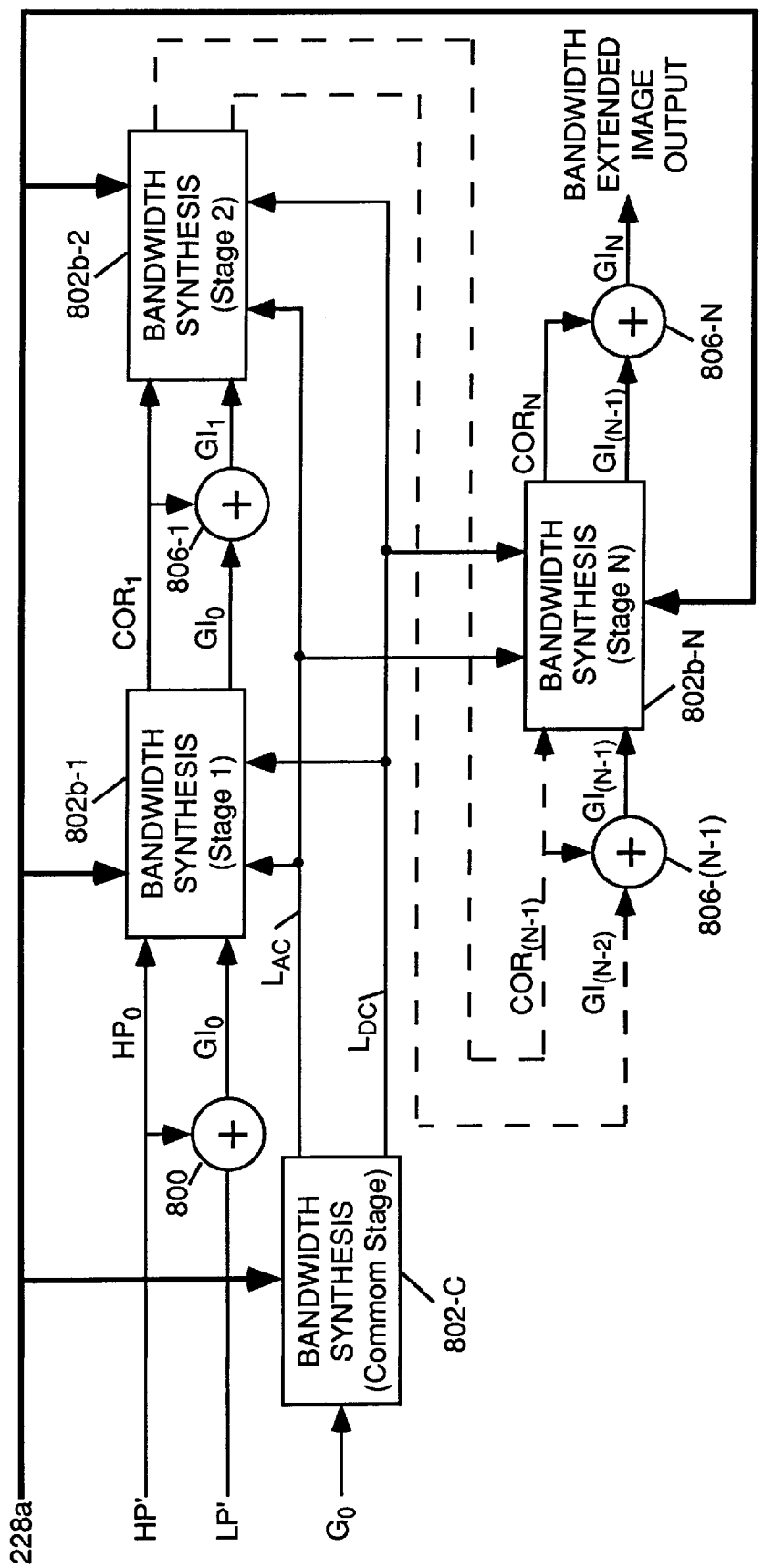

The not insignificant cost of a set of N–1 HP filters can be saved, with only a slight degradation in performance of synthetic bandwidth extension means 602, by employing the simplified second preferred embodiment of synthetic bandwidth extension means 602 shown in FIG. 8b, instead of the first preferred embodiment of synthetic bandwidth extension means 602 shown in FIG. 8a. The second preferred embodiment of digitally-controlled synthetic bandwidth extension means 602, which may be employed in combination with either the above-described first or second preferred embodiments of digitally-controlled 2D interpolator 600, is shown in FIG. 8b (which second preferred embodiment of digitally-controlled synthetic bandwidth extension means 602 comprises a modification of the preferred embodiment of the synthetic bandwidth extension means 602 shown in FIG. 8b of our aforesaid copending patent application Ser. No. 09/112539).

Specifically, FIG. 8b replaces the ordinally-arranged set of bandwidth synthesis stages 802a-1 . . . 802a-N with the ordinally-arranged set of bandwidth synthesis stages 802b-1 . . . 802b-N and replaces the set of ordinally-arranged HP filters 804-1 . . . 804-(N–1) with the ordinally-arranged set of summers 806-1 . . . 806-N. Reference may be made to FIG. 9b of our aforesaid copending patent application Ser. No. 09/112539 for a showing of the detailed structure of each of bandwidth synthesis stages 802b-1 . . . 802b-N. However, the structure of each bandwidth synthesis stage 802b-K differs from each bandwidth synthesis stage 802a-K in only one material respect. In particular, the synthetically-derived frequency components included in each of the pixel values of represented by waveform 934 constitute the $COR_k$ (i.e., correction) output from bandwidth synthesis stage 802b-K, so that bandwidth synthesis stage 802b-K does not include summing means for adding each of the pixel values of represented by waveform 934 to the corresponding pixel value of the interpolated $GI_{(K-1)}$ data stream. Instead, the $COR_k$ output from bandwidth synthesis stage 802b-K is added externally the $GI_{(K-1)}$ output from bandwidth synthesis stage 802b-K in summer 806-K.

It is apparent from the above description of FIGS. 8a and 8b that synthetic bandwidth extension means 602 generates the added high frequency components that were absent in the bandwidth defined by the pixel values of the data stream input to means 602 by processing solely the pixel values of this data stream input in real time (i.e., without any need for supplying extrinsic high frequency information to synthetic bandwidth extension means 602).

Figure 10A:
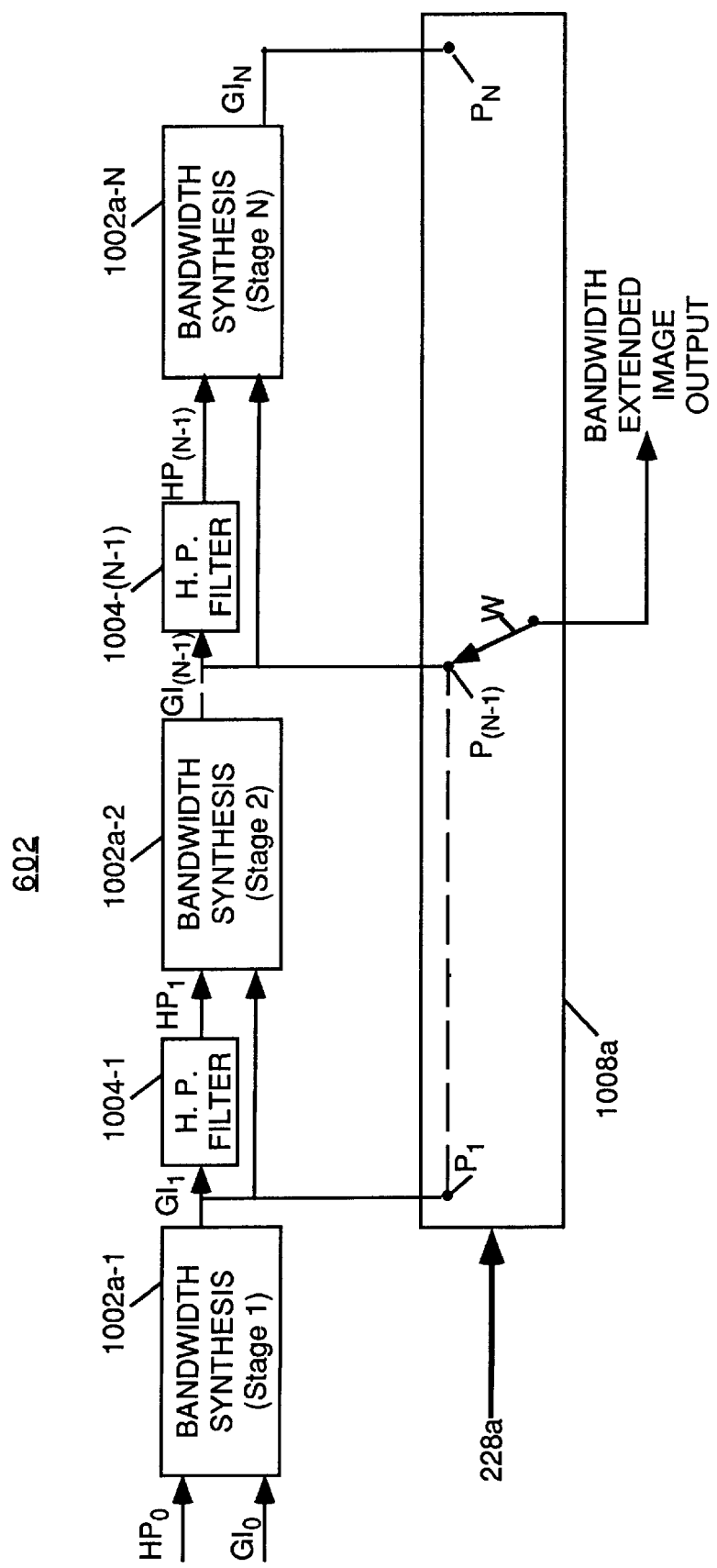
FIG. 10a is a block diagram of a modification of the digitally-controlled synthetic bandwidth extension means of FIG. 8a and FIG. 10b is a block diagram of a modification of the digitally-controlled synthetic bandwidth extension means of FIG. 8b.
Figure 10B:
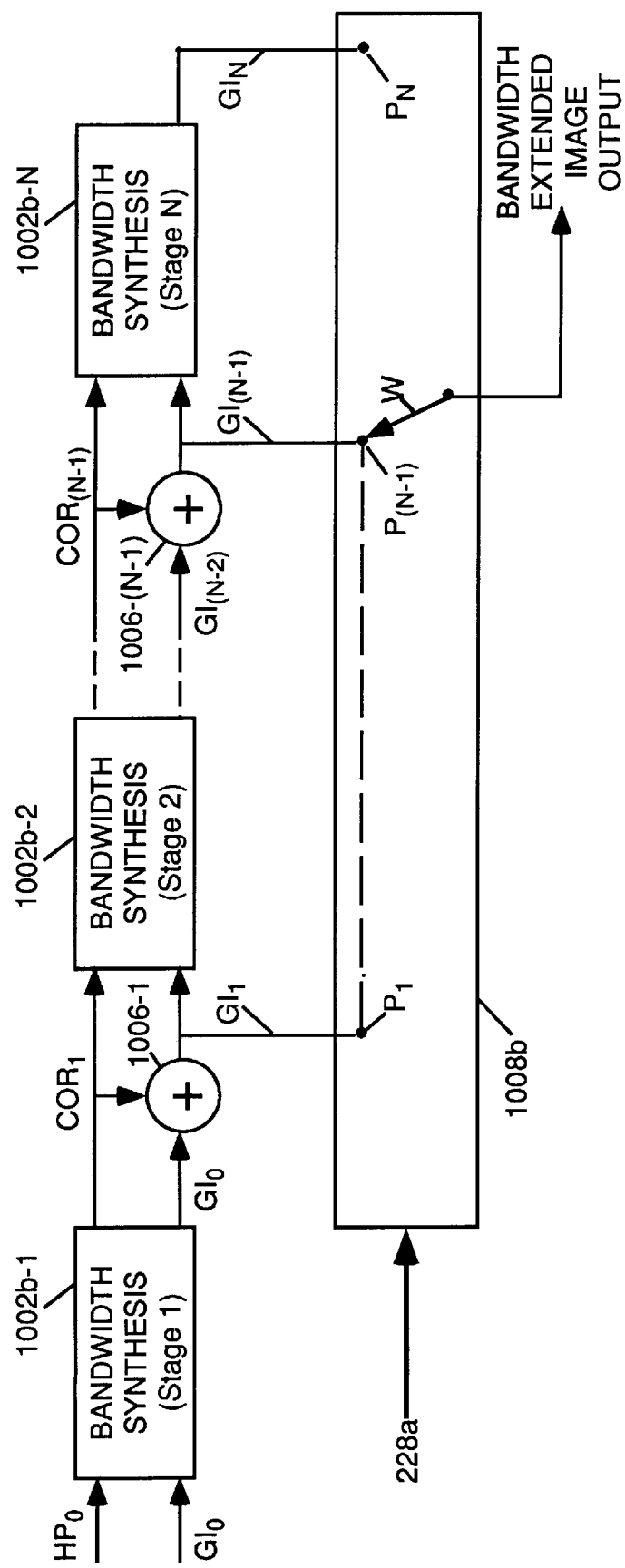

Each of the first and second preferred embodiments of synthetic bandwidth extension means 602 (shown, respectively, in FIGS. 8a and 8b) employ certain values of digital-control 228a applied as a control input to each of the ordinally-arranged N bandwidth synthesis stages thereof to determine the value of the multiplier employed in generating the maximum value R of waveform 930 of FIG. 9. However, as shown in FIG. 10a, a value of digital-control 228a applied as a control input to a digitally-controlled N-pole, single-throw switch 1008a may be used to determine how many of the ordinally-arranged N bandwidth synthesis stages 1002a-1 to 1002a-N are effective in deriving the bandwidth extended image output from FIG. 10a. In particular, the outputs $GI_1$ to $GI_N$ from bandwidth synthesis stages 1002a-1 to 1002a-N are applied, respectively, to poles $P_1$ to $P_N$ of digitally-controlled switch 1008a, and wiper W of switch 1008a value is operated in accordance with the value of digital-control 228a input thereto to thereby obtain the bandwidth extended image output from that one of the outputs $GI_1$ to $GI_N$ from bandwidth synthesis stages 1002a-1 to 1002a-N to which wiper W of switch 1008a is then connected. Similarly, as shown in FIG. 10b, the outputs $GI_1$ to $GI_N$ from bandwidth synthesis stages 1002b-1 to 1002b-N are applied, respectively, to poles $P_1$ to $P_N$ of digitally-controlled switch 1008a, and wiper W of switch 1008b value is operated in accordance with the value of digital-control 228a input thereto to thereby obtain the bandwidth extended image output from that one of the outputs $GI_1$ to $GI_N$ from bandwidth synthesis stages 1002b-1 to 1002b-N to which wiper W of switch 1008b is then connected.

It is apparent that, if desired, the structure of each of the first and second preferred embodiments of synthetic bandwidth extension means 602 could be modified to employ certain values of digital-control 228a applied as a control input thereto to determine both the value of the multiplier employed in generating the maximum value R of waveform 930 of FIG. 9 and to control the operation of a digitally-controlled N-pole, single-throw switch to obtain the bandwidth extended image output from that one of the outputs $GI_1$ to $GI_N$ from bandwidth synthesis stages 1002b-1 to 1002b-N to which wiper W of the digitally-controlled switch is then connected.

In the case of FIG. 6a, which is suitable for use wherein pre-processor 222 employs the second embodiment thereof shown in FIG. 4 in which no resultant reduction in video size has been effected thereby, there is no need for digitally-controlled 2D interpolator 600 of FIG. 6. Therefore, in FIG. 6a, digitally-controlled switch 604, when operated, applies the digital data output from compression decoder 208 directly to the input of synthetic bandwidth extension means 602. Should synthetic bandwidth extension means 602 of FIG. 6a be implemented in the manner shown in above-described FIG. 8a, 8b, 10a or 10b, the common bandwidth synthesis stage thereof would also have no need for digitally-controlled 2D interpolators. However, in the case of FIG. 6a, the digital data output from compression decoder 208 (which corresponds with the digital data output from digitally-controlled upper-frequency cutoff 2D low-pass filter 402 of FIG. 4) is oversampled. In such a case, synthetic bandwidth extension means 602 may be employed to generate bandwidth extended image output components higher in spatial frequency than the highest frequency component of the digital data output from compression decoder 208 (as taught in our aforesaid copending patent application Ser. No. 09/112539).

It is obvious that the very fine image detail defined by the high spatial frequencies included in the original digital video output that are permanently removed by the operation of pre-processor 222 can never be recovered by the operation of synthetic bandwidth extension means 602 of post-processor 224. However, the operation of digitally-controlled synthetic bandwidth extension means 602, which is effective in adding synthetically-generated high spatial frequencies that sharpen the blurred image edges that resulted from the operation of pre-processor 222, greatly enhance the appearance of each successively-displayed image frame of a motion picture defined by the bandwidth extended image output from of digitally-controlled synthetic bandwidth extension means 602.

In the case of a narrow-band transmission channel (e.g., a telephone-line pair) the use of the present invention makes it possible to increase the transmitted number of frames per second of a motion picture at the expense of using pre-processor 222 at the transmitter end to reduce the spatial frequencies included in each image frame successively-transmitted over the narrow-band transmission channel. Then, post-processor 224 may be employed at the receiver end to extend the spatial frequency bandwidth of each image frame successively-transmitted over the narrow-band transmission channel.

In the case of a wide-band transmission channel (e.g., a television-band-wide wireless or fiber-optic channel) the use of the present invention makes it possible to never having to decrease the quantization of the level of quantization of the image samples in response to the occurrence of excessive image-frame spatial information, since the excessive image-frame spatial information can be eliminated by the operation of pre-processor 222 at the transmitter end and then substantially restored by the operation of post-processor 224 at the receiver end.

What is claimed is:

1. In a compressed data system for communicating content of each of successive original frames of a digital motion picture over a limited-bandwidth transmission channel; wherein said compressed data system includes (1) first means comprising a compression encoder for compressing said content and a transmitter for controlling the application of said compressed content to said limited-bandwidth transmission channel, and (2) second means comprising a receiver for receiving said compressed content transmitted thereto over said limited bandwidth transmission channel and a compression decoder for decompressing said compressed content appearing at an output of said receiver; the improvement wherein (3) said first means further comprises a pre-processor for pre-processing said content of each of said successive original frames forwarded as an input to said compression encoder and (4) said second means further comprises a post-processor for post-processing an output from said compression decoder, and wherein:

said pre-processor includes first digitally-controlled means, responsive to a digital control value of a first digital control signal being applied as a control input thereto which is indicative of said bandwidth of said compressed content exceeding the limited bandwidth of said transmission channel, for reducing the spatial bandwidth of the content of each of original frame by a selected amount which is sufficient to maintain the bandwidth of said compressed content within the limited bandwidth of said transmission channel, and said first digitally-controlled means derives a second digital control signal comprising one or more digital control values indicative of those operations performed by said first digitally-controlled means in reducing the spatial bandwidth of the content of each of original frame by said selected amount;

third means including said transmitter and said receiver for directly transmitting said second digital control signal, without said second digital control signal ever being compressed by said compression encoder, from said pre-processor to said post-processor over said limited-bandwidth transmission channel for communicating said second digital control signal to said post-processor for processing thereby; and said post-processor includes second digitally-controlled means responsive to said one or more second digital control values of said second digital signal communicated thereto for synthetically extending the reduced spatial bandwidth of such a reduced-spatial-frequency frame at said output from said compression decoder to substantially the spatial bandwidth of the content of that original frame.

2. The compressed data system defined in claim 1, wherein said transmitter includes a data buffer and a data packetizer, wherein:

said data buffer has successive output data values from said compression encoder written and stored therein and successive stored data values in said data buffer read out therefrom applied as an input to said data packetizer, whereby the number of data values currently stored in said data buffer depends on the relative difference in the rates at which said data values are written into and read out from said data buffer, and a digital control value of said first digital control signal being derived by said data buffer whenever the number of data values currently stored in said data buffer rises to at least one predetermined threshold value; and said data packetizer derives a data packet including a header in response to each compressed data value read out as an input to said data packetizer, and said second digital control signal is applied from said first digitally-controlled means to said data packetizer for including information defining said one or more digital control values of said second digital control signal to be communicated over said limited-bandwidth transmission channel to said post-processor of said second means in the header of each derived data packet.

3. The compressed data system defined in claim 2, wherein said receiver includes a data depacketizer, wherein:

said data depacketizer (a) recovers each compressed data value read out as an input to said data packetizer from its received data packet communicated to said data depacketizer over said limited-bandwidth transmission channel, (b) applies each recovered compressed data value as a first output from said receiver to the input of said compression decoder, (c) recovers said second digital control signal comprising said one or more digital control values from the information defined by the headers of received data packets communicated to said data depacketizer over said limited-bandwidth transmission channel, and (d) applies said recovered second digital control signal comprising said one or more digital control values as a control input to said second digitally-controlled means of said post-processor.

4. The compressed data system defined in claim 1, wherein:

said first digitally-controlled means comprises a reduce-size 2D resampling means and first digitally-controlled coupling means, said first digitally-controlled coupling means being effective in forwarding said content of each of said successive original frames of said digital motion picture through said reduce-size 2D resampling means as an input to said compression encoder only in response to said digital control value of said first digital control signal being indicative of said bandwidth of said compressed content exceeding the limited bandwidth of said transmission channel, and otherwise said first digitally-controlled coupling means being effective in directly forwarding said content of each of said successive original frames of said digital motion picture resampling means as an input to said compression encoder;

said second digital control signal communicated to said second digitally-controlled means includes one second digital control value indicative of said content of each of said successive original frames of said digital motion picture having been forwarded through said reduce-size 2D resampling means as an input to said compression encoder; and said second digitally-controlled means comprises a 2D interpolator having its output applied to the input of a synthetic bandwidth extension means and second digitally-controlled coupling means, said second digitally-controlled coupling means being effective in forwarding the output of said compression decoder through said 2D interpolator and said synthetic bandwidth extension means as the output from said post-processor only in response to said second digital control signal including said one second digital control value, and otherwise said second digitally-controlled coupling means being effective in directly forwarding the output of said compression decoder as the output from said post-processor.

5. The compressed data system defined in claim 4, wherein:

said first digitally-controlled coupling means comprises a first input digitally-controlled switch and a first output digitally-controlled switch which are operated in response to said digital control value of said first digital control signal applied as a control input thereto, and said second digitally-controlled coupling means comprises a second input digitally-controlled switch and a second output digitally-controlled switch which are operated in response to said one second digital control value of said second digital control signal applied as a control input thereto.

6. The compressed data system defined in claim 4, wherein:

said digital control value of said first digital control signal depends on the amount by which said bandwidth of said compressed content exceeds the limited bandwidth of said transmission channel;

said reduce-size 2D resampling means is a digitally-controlled reduce-size 2D resampling means that is effective in reducing the 2D size of an original frame of said digital motion picture forwarded through said resampling means by a reduction factor having a value 1/C determined by the current digital control value of said first digital control signal applied as a control input to said digitally-controlled reduce-size 2D resampling means;

said second control signal, which is communicated to said second digitally-controlled means of said post-processor, includes at least one other second digital control value determined by the value 1/C of said reduction factor; and said 2D interpolator of said second digitally-controlled means is a digitally-controlled 2D interpolator that is effective in providing an interpolation expansion factor C having a value determined by said one other second digital control value of said second control signal which is the inverse of the value 1/C of said reduction factor;

whereby the 2D size of a frame at the output from said 2D interpolator is the same as the size of said original frame of said digital motion picture.

7. The compressed data system defined in claim 6, wherein:

C is an improper fraction having a value equal to M/N, where M is a first positive integer and N is a second positive integer smaller in value than M.

8. The compressed data system defined in claim 6, wherein:

said digitally-controlled reduce-size 2D resampling means comprises the combination of a $1/C_1$ reduction-factor reduce-size 2D resampler and a $C_2$, expand-factor expand-size 2D resampler, where $C_1 > C_2$, so that said reduce-size 2D resampling means is effective in reducing the 2D size of an original frame of said digital motion picture forwarded through said reduce-size 2D resampling means by a value of said reduction factor C equal to $C_2/C_1$; and said 2D interpolator of said second digitally-controlled means is a digitally-controlled 2D interpolator that is effective in providing an interpolation expansion factor C having a value equal to $C_1/C_2$.

9. The compressed data system defined in claim 6, wherein:

said second control signal, which is communicated to said second digitally-controlled means of said post-processor, includes one or more additional other second digital control value determined by the value 1/C of said reduction factor; and said synthetic bandwidth extension means of said second digitally-controlled means is a digitally-controlled synthetic bandwidth extension means that is effective in synthetically extending the spatial frequency of a current frame of said digital motion picture appearing at the output from said post-processor by an amount which depends on the value C defined by said one or more additional other second digital control values of said second control signal for that current frame.

10. The compressed data system defined in claim 9, wherein:

said digitally-controlled synthetic bandwidth extension means comprises a series of a given number N of ordinally-arranged interconnected digitally-controlled bandwidth-synthesis stages, wherein each stage is effective in extending the spatial frequency of the current frame of said digital motion picture appearing at the input of that stage by a certain amount, whereby said series of N interconnected digitally-controlled bandwidth-synthesis stages is capable of maximally extending the spatial frequency of the current frame of said digital motion picture by a total amount determined by the sum of the respective amounts of spatial-frequency extension effected by each of said N interconnected digitally-controlled bandwidth-synthesis stages; and applying an additional other second digital control value of said second control signal as a control input to at least one of said digitally-controlled bandwidth-synthesis stages to adjust the amount of spatial-frequency extension effected by a digitally-controlled bandwidth-synthesis stage to which an additional other second digital control value of said second control signal is applied in accordance with that applied additional other second digital control value.

11. The compressed data system defined in claim 9, wherein said digitally-controlled synthetic bandwidth extension means comprises:

a series of a given number N of ordinally-arranged interconnected bandwidth-synthesis stages, wherein each stage is effective in extending the spatial frequency of the current frame of said digital motion picture appearing at the input of that stage by a certain amount, whereby said series of N interconnected bandwidth-synthesis stages is capable of maximally extending the spatial frequency of the current frame of said digital motion picture by a total amount determined by the sum of the respective amounts of spatial-frequency extension effected by each of said N bandwidth-synthesis stages; and a digitally-controlled N-pole, single-throw switch means including a wiper having an output from each of said N interconnected bandwidth-synthesis stages applied to the corresponding one of said N poles of said digitally-controlled switch means and an output from said wiper of said digitally-controlled switch means forwarded as the output from said post-processor, and said wiper of said digitally-controlled switch means being operated to contact a selected one of said N poles in accordance with an additional other second digital control value of said second control signal applied as a control input to said digitally-controlled switch means;

whereby the subset of said series of N interconnected bandwidth-synthesis stages which are effective in extending the spatial frequency of the current frame of said digital motion picture at the output from said post-processor is determined by the selected one of said N poles contacted by said wiper of said digitally-controlled switch means.

12. The compressed data system defined in claim 1, wherein:

said first digitally-controlled means comprises an upper-frequency cutoff 2D low-pass filter and first digitally-controlled coupling means, said first digitally-controlled coupling means being effective in forwarding said content of each of said successive original frames of said digital motion picture through said upper-frequency cutoff 2D low-pass filter as an input to said compression encoder only in response to said digital control value of said first digital control signal being indicative of said bandwidth of said compressed content exceeding the limited bandwidth of said transmission channel, and otherwise said first digitally-controlled coupling means being effective in directly forwarding said content of each of said successive original frames of said digital motion picture resampling means as an input to said compression encoder;

said second digital control signal communicated to said second digitally-controlled means includes one second digital control value indicative of said content of each of said successive original frames of said digital motion picture having been forwarded through said upper-frequency cutoff 2D low-pass filter as an input to said compression encoder; and said second digitally-controlled means comprises a synthetic bandwidth extension means and second digitally-controlled coupling means, said second digitally-controlled coupling means being effective in forwarding the output of said compression decoder said synthetic bandwidth extension means as the output from said post-processor only in response to said second digital control signal including said one second digital control value, and otherwise said second digitally-controlled coupling means being effective in directly forwarding the output of said compression decoder as the output from said post-processor.

13. The compressed data system defined in claim 12, wherein:

said first digitally-controlled coupling means comprises a first input digitally-controlled switch and a first output digitally-controlled switch which are operated in response to said digital control value of said first digital control signal applied as a control input thereto, and said second digitally-controlled coupling means comprises a second input digitally-controlled switch and a second output digitally-controlled switch which are operated in response to said one second digital control value of said second digital control signal applied as a control input thereto.

14. The compressed data system defined in claim 12, wherein:

said digital control value of said first digital control signal depends on the amount by which said bandwidth of said compressed content exceeds the limited bandwidth of said transmission channel;

said upper-frequency cutoff 2D low-pass filter comprises the serial combination of a digitally-controlled reduce-size 2D resampler followed by a digitally-controlled expand-size 2D re sampler, said digitally-controlled reduce-size 2D resampler being effective in reducing the 2D size of an original frame of said digital motion picture forwarded thereto by a reduction factor having a value 1/C determined by the current digital control value of said first digital control signal applied as a control input to said digitally-controlled reduce-size 2D resampler, and said digitally-controlled expand-size 2D resampler being effective in expanding the 2D reduced size of a frame of said digital motion picture forwarded thereto by an expansion factor having a value C determined by the current digital control value of said first digital control signal applied as a control input to said digitally-controlled expand-size 2D resampler, whereby the 2D size of a frame at the output from said serial combination is the same as the size of said original frame of said digital motion picture and the upper-frequency cutoff at the output from said serial combination is reduced in accordance with the 1/C value of said reduction factor; and said second control signal, which is communicated to said second digitally-controlled means of said post-processor, includes one or more additional second digital control values which are determined by the value 1/C of said reduction factor.

15. The compressed data system defined in claim 14, wherein:

said synthetic bandwidth extension means of said second digitally-controlled means is a digitally-controlled synthetic bandwidth extension means that is effective in synthetically extending the spatial frequency of a current frame of said digital motion picture appearing at the output from said post-processor by an amount which depends on the value C defined by said one or more additional other second digital control values of said second control signal for that current frame.

16. The compressed data system defined in claim 15, wherein:

said digitally-controlled synthetic bandwidth extension means comprises a series of a given number N of ordinally-arranged interconnected digitally-controlled bandwidth-synthesis stages, wherein each stage is effective in extending the spatial frequency of the current frame of said digital motion picture appearing at the input of that stage by a certain amount, whereby said series of N interconnected digitally-controlled bandwidth-synthesis stages is capable of maximally extending the spatial frequency of the current frame of said digital motion picture by a total amount determined by the sum of the respective amounts of spatial-frequency extension effected by each of said N interconnected digitally-controlled bandwidth-synthesis stages; and applying an additional other second digital control value of said second control signal as a control input to at least one of said digitally-controlled bandwidth-synthesis stages to adjust the amount of spatial-frequency extension effected by a digitally-controlled bandwidth-synthesis stage to which an additional other second digital control value of said second control signal is applied in accordance with that applied additional other second digital control value.

17. The compressed data system defined in claim 15, wherein said digitally-controlled synthetic bandwidth extension means comprises:

a series of a given number N of ordinally-arranged interconnected bandwidth-synthesis stages, wherein each stage is effective in extending the spatial frequency of the current frame of said digital motion picture appearing at the input of that stage by a certain amount, whereby said series of N interconnected bandwidth-synthesis stages is capable of maximally extending the spatial frequency of the current frame of said digital motion picture by a total amount determined by the sum of the respective amounts of spatial-frequency extension effected by each of said N bandwidth-synthesis stages; and a digitally-controlled N-pole, single-throw switch means including a wiper having an output from each of said N interconnected bandwidth-synthesis stages applied to the corresponding one of said N poles of said digitally-controlled switch means and an output from said wiper of said digitally-controlled switch means forwarded as the output from said post-processor, and said wiper of said digitally-controlled switch means being operated to contact a selected one of said N poles in accordance with an additional other second digital control value of said second control signal applied as a control input to said digitally-controlled switch means;

whereby the subset of said series of N interconnected bandwidth-synthesis stages which are effective in extending the spatial frequency of the current frame of said digital motion picture at the output from said post-processor is determined by the selected one of said N poles contacted by said wiper of said digitally-controlled switch means.

\* \* \* \* \*